United States Patent [19]
Shigeta et al.

[11] Patent Number: 4,459,342
[45] Date of Patent: Jul. 10, 1984

[54] RIBBED SUBSTRATE FOR FUEL CELL ELECTRODE

[75] Inventors: Masatomo Shigeta; Kuniyuki Saitoh; Hiroyuki Fukuda, all of Iwaki, Japan

[73] Assignee: Kureha Kagaku Kogyo Kabushiki Kaisha, Tokyo, Japan

[21] Appl. No.: 524,915

[22] Filed: Aug. 19, 1983

[30] Foreign Application Priority Data

Sep. 10, 1982 [JP] Japan .................. 57-157714

[51] Int. Cl.³ .............................................. H01M 2/00
[52] U.S. Cl. .................................... 429/34; 429/143; 429/145; 429/209; 429/233; 427/115; 204/290 R
[58] Field of Search ............. 429/143, 144, 145, 209, 429/233, 234, 34; 427/115; 204/290 R

[56] References Cited

U.S. PATENT DOCUMENTS 3,829,327  8/1974  Omori et al. ............... 429/218
4,113,927  9/1978  Johnson et al. ............ 429/143
4,363,857  12/1982 Mix ............................ 429/234

Primary Examiner—Charles F. LeFevour
Attorney, Agent, or Firm—Lyon & Lyon

[57] ABSTRACT

A porous ribbed substrate for a fuel cell electrode is herein disclosed which has a ribbed layer on one side and a non-ribbed layer with a bulk density larger than the bulk density of the ribbed layer. The fuel cell electrode substrate has a porosity of 50-80% and good mechanical strength such as a bending strength of not less than 50 kg/cm². A fuel cell prepared from the electrode substrate has excellent properties.

4 Claims, No Drawings

RIBBED SUBSTRATE FOR FUEL CELL ELECTRODE

The present invention relates to a fuel cell electrode substrate, particularly an electrode substrate having a double layer structure, that is termed by "a ribbed layer" and "a non-ribbed layer", respectively, each layer having different properties from one another.

A ribbed electrode substrate for a monopolar fuel cell has been developed which has a ribbed surface on one side and a flat surface having a catalyst layer thereon on the other side. Such an electrode substrate is carbonaceous and porous as a whole. A cell is composed of two electrode substrates with a catalyst layer thereon and a matrix therebetween for holding electrolyte. In a stack of such cells to form a fuel cell, a separator plate is disposed between two adjacent cells in contact therewith. Reactant gases (hydrogen as a fuel gas and oxygen or air) are fed via channels formed by ribs of the substrate and the separator plate and the gases diffuse from the ribbed surface to the flat surface in the electrode substrate to reach the matrix.

For preparing such an electrode substrate, the various methods previously proposed may be used. For example, one method for preparing a general electrode substrate was proposed in Japanese Patent Application Laying Open No. 166354/82 wherein a mixture based on short carbonaceous fibers is pressed to form a porous shaped article. Another proposed method was described in Japanese Patent Publication No. 18603/78 in which method a machined paper of carbon fibers is impregnated with an organic polymer solution and is made into a porous carbon fiber paper. Still another method for preparing an electrode substrate was proposed in U.S. Pat. No. 3,829,327 wherein a web of carbon fibers is subjected to chemical vapor deposition of carbon to form a porous electrode substrate. These electrode substrates have a substantially homogeneous monolayer structure.

Such a homogeneous monolayer electrode substrate has, however, demerits such as follows: with a high bulk density of a substrate, there is obtained a low limiting current density due to low diffusion of reactant gases and a rapid deterioration of performance of a fuel cell due to insufficient storage of electrolyte in the substrate, and therefore the life of a fuel cell is shortened; on the other hand, demerits are high electric and thermal resistance and a low mechanical strength such as a bending strength, with a low bulk density of an electrode substrate.

It is an object of the present invention to provide an electrode substrate without such demerits.

Another object of the invention is to provide a fuel cell electrode substrate having a double layer structure, each layer having different properties from each other.

Still another object of the invention is to provide a ribbed porous electrode substrate with excellent properties for a fuel cell.

A still further object of the present invention is to provide an electrode substrate for a fuel cell having a high mechanical strength such as a bending strength and a high porosity.

An electrode substrate to be provided according to the present invention having two layers with different bulk densities, that is a non-ribbed layer with a higher bulk density and a ribbed layer with a lower bulk density.

The ribbed layer of the electrode substrate of the present invention has ribs on the outer surface thereof to be abutted to a separator plate in a fuel cell. The ribs may form together with the separator U-shaped channels for feeding reactant gases. The ribbed layer of the substrate preferably has a bulk density of 0.4–0.7 g/cm$^3$.

The non-ribbed layer of the electrode substrate according to the invention has a flat surface on the outer side thereof and a bulk density higher than the bulk density of the ribbed layer. The bulk density of the non-ribbed layer is preferably in the range of 0.5–0.9 g/cm$^3$ for a desired diffusion or permeation of reactant gases and for a desired holding of a given amount of catalyst and electrolyte. The thickness of the non-ribbed layer is from 1/50 to ⅓ of the total thickness of the electrode substrate minus a thickness of the ribs.

These values of the bulk densities in two layers provide the electrode substrate with a desired mechanical strength such as a bending strength of not less than 50 kg/cm$^2$.

Generally, it is desirable for a fuel cell that a good diffusion of reactant gases through pores in the electrode substrate is maintained in the whole part of the substrate. In the present invention, the electrode substrate is porous as a whole and has a porosity of 50–80% and not less than 70% of the pores are open pores. Furthermore, the diameter of pores in the substrate of the invention is distributed in a narrow range. That is to say, not less than 60% of the pores in the ribbed layer have diameter in the range of 5–50 μm and not less than 60% of the pores in the non-ribbed layer have diameter in the range of 1–30 μm. Furthermore, an average diameter of pores in the ribbed layer is preferably larger than an average diameter of pores in the non-ribbed layer. Such pore diameters result in a better application of the electrode substrate of the invention to a fuel cell.

The electrode substrate of the present invention may be prepared by various methods, for example pressing process, paper-machining process or coating process. In the pressing process, raw materials for each layers, i.e. the non-ribbed layer and the ribbed layer, are separately supplied into a die having a predetermined configuration and pressed while heating. In the paper-machining process, a machined paper of mixed carbon fibers as the non-ribbed layer is laminated onto a pressed part prepared from the same raw material as the pressing process for the ribbed layer. In the third method (the coating process), a mixture of a filler e.g. active carbon or carbon black and a thermosetting resin e.g. a liquid phenol resin (in an alcohol as a solvent) as the non-ribbed layer is coated onto a pressed part prepared from the same raw material as the pressing process for the ribbed layer.

A raw material for the ribbed layer of the invention may be appropriately selected from carbon fiber and active carbon for a filler, a polymer substance with a sharp distribution of particle diameters such as polyvinyl alcohol, polyethylene, polypropylene, polyvinyl chloride and suger for a pore regulator and thermosetting resins such as phenol resin for a binder.

A raw material for the non-ribbed layer of the invention may be suitably selected from known materials to be appropriately used depending onto the processes. In the pressing process, a filler may be carbon fiber, granular active carbon or the like, a pore regulator may be the same as for the ribbed layer and a binder may be phenol resin or the like. In the paper-machining process, a filler may be carbon fiber or the like, a pore regulator may be polyvinyl alcohol fiber or the like and a binder may be liquid phenol resin or the like. In the coating process, a filler may be granular active carbon, carbon black or the like, a pore regulator may be the same as the pressing process and a binder may be the same as the paper-machining process.

As an example of the preparation process of the electrode substrate of the present invention will be described hereinafter in more detail, particularly the pressing process using short carbon fiber as a filler, granular polyvinyl alcohol as a pore regulator and powdery phenol resin as a binder.

The raw material for the ribbed layer may comprise a mixture of 30–50% by weight of carbon fiber with an average fiber length of not more than 1 mm and a diameter in the range of 3–30 μm, 20–50% by weight of granular polyvinyl alcohol, particle diameters of at least 70% by weight of which are distributed in the range of 100–300 μm, and 10–40% by weight of powdery phenol resin with diameter of not more than 100 μm thoroughly blended by a mixing mill such as a Henschel mixer.

The raw material for the non-ribbed layer of the invention may comprise a similar mixture of the same components as above-mentioned, except that the mixed amount of the granular polyvinyl alcohol is smaller by 5–20% by weight than above-mentioned. Without this range of the mixed amounts, a gas permeability and/or a mechanical strength of a substrate to be obtained will be insufficient for a practical fuel cell.

The mixture for the ribbed layer is fed into a die having a proper configuration by a quantitative feeder such as a belt feeder in a predetermined amount so as to obtain a desired thickness. The mixture for the non-ribbed layer is then fed onto the supplied mixture for the ribbed layer by another feeder in a predetermined amount so as to make two layers.

The supplied mixtures are pressed by a heat press under the suitable conditions selected from die temperature of 100°–200° C., molding pressure of 5–100 kg/cm² and molding period of 2–60 minutes. The suitable conditions for molding will be easily determined for those skilled in the art.

The pressed sheet is postcured without pressure for at least 2 hours and thereafter calcinated at 1500°–2400° C. in an inert gas atmosphere. In the heating procedure, a slow increase of temperature between 300° C. and 700° C. is preferable since carbonization of polyvinyl alcohol and phenol resin is proceeded in the temperature region.

The electrode substrate of the present invention is markedly suitable for a monopolar fuel cell and a fuel cell may be prepared from the substrates in a conventional manner by stacking cells comprising two substrates and matrix layer therebetween for holding phosphoric acid while disposing a separator plate between two adjacent cells in contact with the ribbed surface of the substrate.

In the electrode substrate of the invention, the ribbed layer can hold sufficient amount of electrolyte within pores therein and therefore a deterioration of performance of an obtained fuel cell due to dissipation of phosphoric acid may be significantly reduced since the amount of phosphoric acid to be transferred by mutual diffusion of phosphoric acid-hydrogen and phosphoric acid-oxygen or air is remarkably reduced. On the other hand, the amount of catalyst entering into the non-ribbed layer is markedly reduced with a comparison to a conventional substrate and therefore the amount of catalyst used per unit of generating power is reduced. Furthermore, a high limiting current density is obtained with the electrode substrate of the invention because of high diffusion coefficient of gases due to high porosity.

The invention will be illustrated with respect to the following examples. It will be understood, however, that the invention must not be limited to these examples but various modifications may be carried out and those modifications will be also included within the scope of the present invention.

In the examples, the "porosity P (%)" was determined by the following equation while assuming that the real density of a carbonaceous substrate was 1.6 g/cm³;

$$P = (1 - \rho_b/1.6) \times 100$$

wherein $\rho_b$ was the measured bulk density (g/cm³) of a specimen, the "bending strength (kg/cm²)" of a porous carbonaceous shaped article was determined according to Japanese Industrial Standards (JIS) K-6911/1970 while using a specimen with a dimension of 100×10×2.5 mm, and the "pore diameter (μm)" of a specimen was measured by a mercury porosimeter (manufactured by Carlo Erba Strumentazione, Italia). The "gas permeability $Q_a$ (ml/cm²·hr·mmAq.)" was determined in the following manner: a cylindrical specimen of 90 mm in diameter was cut out from either layer of a substrate to be measured, the circumferential side surface of the specimen was treated with a thermosetting resin so that gas might not permeate therethrough, both longitudinal end surfaces of the specimen were then put between two cylindrical gas tubes with flange holding a gasket, a predetermined amount (10 l/min) of air was supplied from one end of the specimen to the other end thereof which was open to the atmosphere, the pressure loss between two ends of the specimen was measured by a manometer attached to the upstream of the gas tube and the gas permeability $Q_a$ was then calculated by the following equation;

$$Q_a = (10 \times 60 \times 10^3)/(50.24 \times \Delta p)$$

wherein $\Delta p$ was the measured pressure loss (mmAq.) and 50.24 cm² was a real area to be measured (a circle of 80 mm in diameter). Further, the "bulk resistance $\rho_r$ (Ωcm)" was determined in the following manner: both ends of a specimen were coated with an electroconductive coating material and an electrical resistance between two ends of the specimen was measured according to SRIS (Standards of Japan Rubber Association) 2301-1969, and then the bulk resistance was calculated by the following equation;

$$\rho_r = R \cdot w/l$$

wherein R was the measured resistance (Ω) between the ends of the specimen, l(cm) was a longitudinal length (direction to be measured), and w(cm) and t(cm) were a horizontal and a vertical lengths, respectively, defining a cross section of the specimen.

EXAMPLE 1

A homogeneous mixture comprising 45% by weight of short carbon fiber with an average fiber length of 0.45 mm and an average fiber diameter of 12 μm (manufactured by Kureha Chemical Industry Co., Ltd.), 35% by weight of polyvinyl alcohol with an average diameter of 180 μm (manufactured by The Nippon Synthetic Chemical Industry Co., Ltd.) as a pore regulator and 20% by weight of phenol resin (manufactured by Asahi Organic Material K.K.) as a binder was supplied into a die for press molding. Another homogeneous mixture comprising 40% by weight of the short carbon fiber, 30% by weight of the polyvinyl alcohol and 30% by weight of the phenol resin was fed onto the supplied mixture so as to be a double layer structure.

The mixture of double layer structure was pressed at 140° C. and 50 kg/cm$^2$ for about 30 minutes and then calcinated at 2000° C. for about one hour.

The obtained electrode substrate had ribs with a thickness of 1 mm, a ribbed layer with a bulk density of 0.56 g/cm$^3$, a porosity of 65%, an average pore diameter of 32 μm and a thickness of 1.6 mm and a non-ribbed layer with a bulk density of 0.65 g/cm$^3$, a porosity of 59%, an average pore diameter of 24 μm and a thickness of 0.5 mm. The electrode substrate had the excellent physical properties such as a permeability of 340 ml/hr·cm$^2$·mmAq., a bending strength of 160 kg/cm$^2$ and a bulk resistance of 26×10$^{-3}$ Ωcm.

EXAMPLE 2

A mixture of 45% by weight of the short carbon fiber, 35% by weight of the polyvinyl alcohol and 20% by weight of the phenol resin was fed into a die and pressed at 140° C. and 50 kg/cm$^2$ for about 30 minutes to form a ribbed layer.

Carbon fiber with an average length of 10 mm and an average fiber diameter of 12 μm (manufactured by Kureha Chemical Industry Co., Ltd.) and polyvinyl alcohol fiber with an average fiber diameter of 10 μm (manufactured by KURARAY CO., LTD.) were mixed in water and subjected to a paper machine followed by drying to obtain a carbon fiber paper.

The carbon fiber paper was thoroughly impregnated with phenol resin and laminated on the ribbed layer at 140° C. and 10 kg/cm$^2$ for about 30 minutes. The laminated sheet was calcinated at 2000° C. for about one hour.

The obtained electrode substrate had ribs with 1 mm in thickness, a ribbed layer with 0.56 g/cm$^3$ in bulk density, 65% in porosity, 32 μm in average pore diameter and 1.6 mm in thickness and a non-ribbed layer with 0.62 g/cm$^3$ in bulk density, 62% in porosity, 26 μm in average pore diameter and 0.4 mm in thickness. The physical properties were 360 ml/hr·cm$^2$·mmAq. in gas permeability, 158 kg/cm$^2$ in bending strength and 28×10$^{-3}$ Ωcm in bulk resistance.

EXAMPLE 3

A mixture of 45% by weight of the short carbon fiber, 35% by weight of the polyvinyl alcohol and 20% by weight of the phenol resin was supplied into a die and pressed at 140° C. and 50 kg/cm$^2$ for about half an hour.

In the same die, a highly viscous mixture of 60% by weight of liquid phenol resin (manufactured by Gunei Chemical K.K.), 30% by weight of carbon black with an average particle diameter of 400 Å (manufactured by Lion K.K.) and 10% by weight of the granular polyvinyl alcohol was coated onto the pressed part and pressed at 140° C. and 10 kg/cm$^2$ for about half an hour.

The pressed product was then calcinated at 2000° C. for about one hour.

The obtained electrode substrate had ribs with 1 mm in thickness on the outer surface of a ribbed layer, a ribbed layer with a bulk density of 0.56 g/cm$^3$, a porosity of 65%, an average pore diameter of 32 μm and a thickness of 1.9 mm and a non-ribbed layer with a bulk density of 0.67 g/cm$^3$, a porosity of 58%, an average pore diameter of 12 μm and a thickness of 0.1 mm. The electrode substrate had the physical properties such as a gas permeability of 410 ml/hr·cm$^2$·mmAq., a bending strength of 139 kg/cm$^2$ and a bulk resistance of 30×10$^{-3}$ Ωcm.

What is claimed is:

1. A porous ribbed substrate for a fuel cell electrode comprising a non-ribbed layer and a ribbed layer having a bulk density smaller than the bulk density of the non-ribbed layer.

2. The substrate of claim 1, in which the bulk density of the ribbed layer is 0.4–0.7 g/cm$^3$ and the bulk density of the non-ribbed layer is 0.5–0.9 g/cm$^3$.

3. The substrate of claim 1 or 2, in which the non-ribbed layer has a thickness of from 1/50 to ¼ of the thickness of the substrate minus the thickness of the ribs.

4. The substrate of any one of claims 1–3 having a bending strength of not less than 50 kg/cm$^2$ and a porosity of 50–80%, not less than 70% of pores being open pores, not less than 60% of the pores in the ribbed layer having a diameter in the range of 5–50 μm, not less than 60% of the pores in the non-ribbed layer having a diameter in the range of 1–30 μm and an average diameter of the pores in the ribbed layer being larger than the average diameter of the pores in the non-ribbed layer.

* * * * *